United States Patent [19]

Saylors

[11] 4,313,183
[45] Jan. 26, 1982

[54] ACOUSTIC DISTANCE MEASURING METHOD AND APPARATUS

[76] Inventor: James A. Saylors, Smokey Rd., Rte. 1, Athens, Ga. 30601

[21] Appl. No.: 163,639

[22] Filed: Jun. 27, 1980

[51] Int. Cl.³ .............................................. G01S 15/74
[52] U.S. Cl. ........................................ 367/128; 367/2; 367/101; 343/112 D
[58] Field of Search .................... 367/101, 128, 2, 134; 343/112 D, 6.5 LC

[56] References Cited

U.S. PATENT DOCUMENTS

| | | | |
|---|---|---|---|
| 3,721,906 | 3/1973 | Geesen et al. | 343/6.5 LC |
| 3,731,273 | 5/1973 | Hunt | 343/112 PT X |
| 3,742,437 | 6/1973 | Thiele | 367/101 |
| 3,757,285 | 9/1973 | Ferre' | 367/108 |
| 4,023,176 | 5/1977 | Currie | 343/112 D |
| 4,055,830 | 10/1977 | Wilson et al. | 367/128 |
| 4,110,725 | 8/1978 | Petrosky | 367/135 |
| 4,144,534 | 3/1979 | Prickett et al. | 343/6.5 LC |

FOREIGN PATENT DOCUMENTS 2741688  3/1979  Fed. Rep. of Germany .......... 367/2

*Primary Examiner*—Richard A. Farley
*Attorney, Agent, or Firm*—Jones, Thomas & Askew

[57] ABSTRACT

An acoustic distance measuring device using a predetermined frequency shift keyed bit pattern as the acoustic signal transmitted and received. A phase lock loop detector is provided. Variations in lag from the time required for the loop to lock are eliminated and the remainder of the FSK bit sequence is detected and accumulated in response to changes in the phase detector output. Preferably the FSK bit sequence is generated via radio frequency transmitter from a first location and reproduced and transmitted acoustically from a second station back to the first station.

3 Claims, 4 Drawing Figures

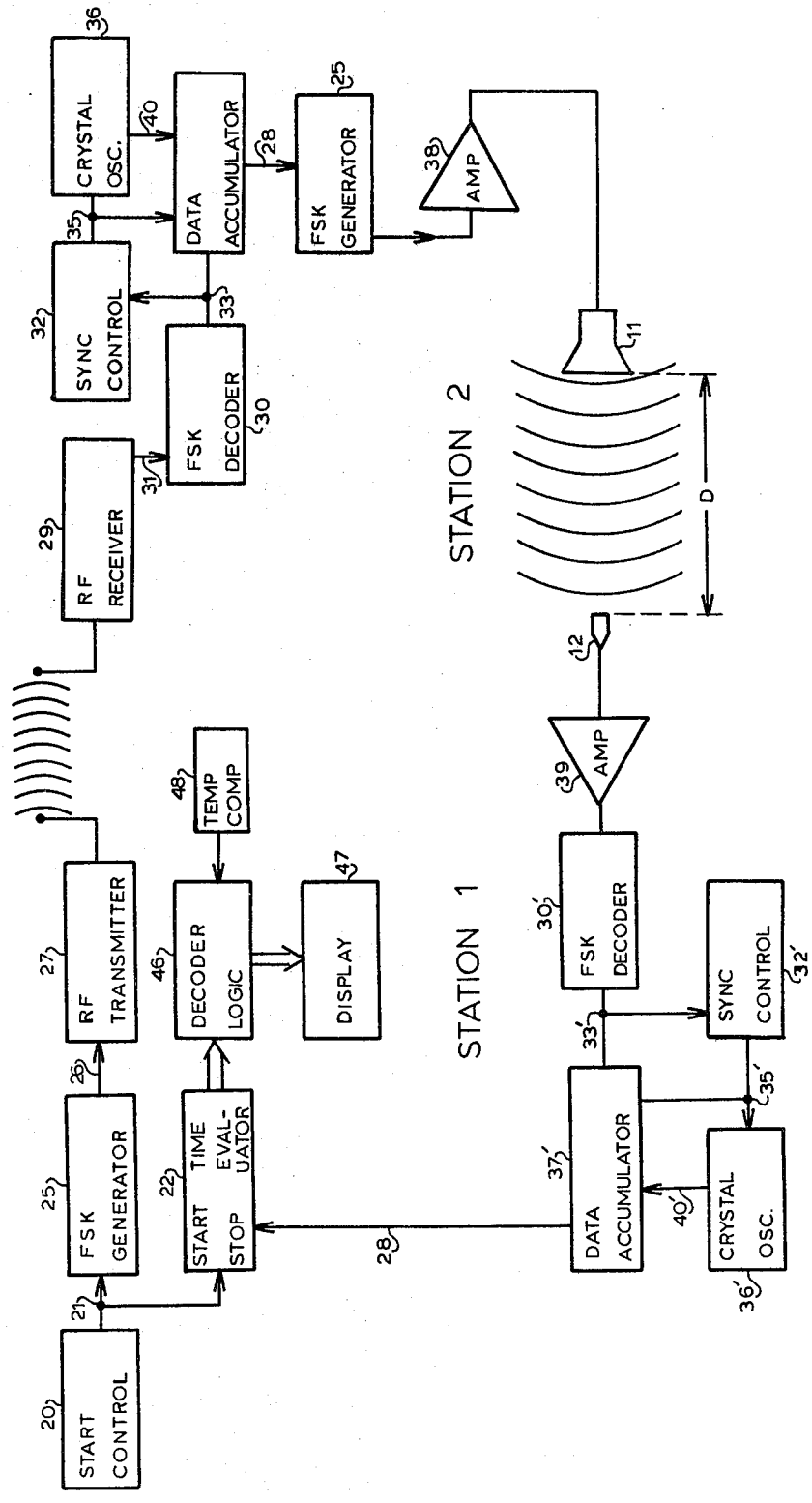
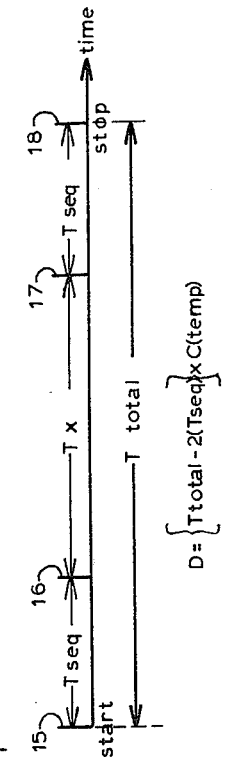
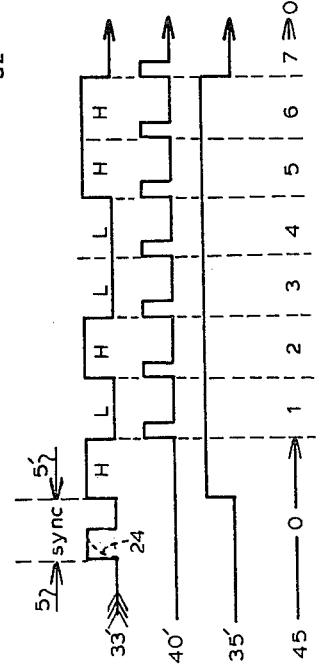
Fig. 1
Fig. 3
Fig. 4
$D = \{T_{total} - 2(T_{seq})\} \times C(temp)$

ACOUSTIC DISTANCE MEASURING METHOD AND APPARATUS

TECHNICAL FIELD

The present invention relates to distance measuring apparatus and more specifically to distance measuring apparatus which determines distance by measuring the transit time of an acoustic wave.

BACKGROUND OF THE INVENTION

For a number of years it has been known to use the transit time of sound waves for distance measuring purposes. Echo ranging techniques including the commonly known sonar, have been known in the art for a number of years.

More recently, one way acoustic distance measuring devices have been provided which use a radio frequency signal both to activate a counter at an acoustic receiving station and to activate an acoustic transmitter at a transmitting station. Such a device is shown in U.S. Pat. No. 4,055,830 to Wilson et al. The apparatus of the Wilson patent uses a radio signal to simultaneously start a counter and begin transmission of an acoustic signal. Upon receipt of the signal by a microphonic device, the signal is amplified through a multistage amplifier having a constant amplitude output which is fed to an active filter. The output of the active filter is rectified and applied to the input of a differentiator, the output of which gates off the counter. The disclosure of the Wilson patent acknowledges that the group delay of an active filter is a function of input amplitide and compensates for possible time skew in the measurements by providing the constant amplitude amplifier.

However, the apparatus of the Wilson does not take into effect possible variations from unit to unit in group delay of an active filter manufactured from off-the-shelf components, nor does the Wilson apparatus take into account the possible differences in time domain responses of differentiators such as those used in the Wilson control circuitry.

The basic principles of acoustic distance measuring are known. In the art of acoustic distance measuring, a major limitation of accuracy of the apparatus is both the absolute time delay of frequency sensitive circuitry and the variability of time response of such circuitry, particularly rise times of electrical outputs in response to initial excitations.

Furthermore, prior art acoustic measuring devices are started and stopped upon initial detection of a particular tone transmitted. This aggravates the aforementioned problem of consistency from device to device or calibration of a particular device according to the group delay and rise time responses of the components used.

The desirability of using frequencies of rather long acoustic wavelength within the audible frequency range is known in the art. However, prior art apparatus such as that of the Wilson patent has limited capability to work in environments in which any substantial amount of ambient noise may be encountered which has a frequency content in the range of the transmitted signal. Such ambient noise would tend to falsely trigger the stop function of the Wilson patent since this stop function is responsive to the derivitive of the rectified output of a notch filter.

It will therefore be appreciated that it is desirable to provide acoustic measuring apparatus which will function satisfactorily in the presence of ambient noise and which can use broader band filters in the signal processing path than the high Q filters used in single tone systems.

It is further desirable to provide an acoustic distance measuring apparatus which may be inexpensively constructed from available components having conventional ranges of value and parameter tolerances wherein the device will not have to be individually calibrated to compensate for characteristics of the individual devices used.

SUMMARY OF THE INVENTION

It is an object of the present invention to overcome the aforesaid limitations of prior art acoustic distance measuring devices by providing an acoustic distance measuring device which provides accurate readings in environments having ambient noise much greater than that which could be tolerated by previous acoustic measuring devices. It is still a further object of the present invention to provide an acoustic measuring system which may be constructed from available electronic components wherein the inherent design of the system prevents the accuracy of the measurements from being a function of the rise time of analog circuit components over a wide range of tolerances.

The present invention overcomes the aforementioned limitations of the prior art by providing a coded sequence of signals which must be received in order to ascertain that the actual transmitted output has been received at a receiving station.

The present invention provides an improved acoustic distance measuring apparatus by providing a sequence of encoded acoustic signals transmitted from the transmitting station to the receiving station. The sequence of received acoustic signals is synchronized with internal electronic circuitry at the receiving station. The total time from beginning of machine operation to termination of the received sequence is counted and the known time required for generation and detection of the sequence is subtracted from the total time measured by a counter. The difference therefore represents the acoustic transit time from the transmitting station to the receiving station.

In its preferred form, the present invention uses a frequency shift keyed (FSK) encoding scheme for the coded sequence of signals. Detection of the frequency shift keyed sequence may therefore be made through band pass filters having lower Qs than the notch filters of the prior art, and the beginning and end of sequence bits may be detected by the inexpensive and fast phase detector outputs of integrated circuit phase lock loops.

A predetermined synchronizing bit sequence is provided in order to establish lock for the phase lock loop, after which the time delay for detection of beginning and end of bits is only a function of the time response of the loop phase detector.

The present invention also uses very accurate digital frequency synthesizing techniques in order to generate the acoustic signal transmitted.

It is therefore an object of the present invention to provide an improved acoustic distance measuring device which can operate properly in the presence of relatively high ambient noise levels.

It is a further object of the present invention to provide an acoustic distance measuring device which transmits and receives a predetermined coded sequence of sounds.

It is still a further object of the present invention to provide an acoustic distance measuring device which uses a first sequence of coded signals to synchronize a receiver to a second coded sequence.

These and other objects of the present invention will become apparent from the detailed description to follow.

BRIEF DESCRIPTION OF THE DRAWINGS

FIG. 1 is a block diagram of a preferred embodiment of the present invention.

FIG. 3 is a timing diagram showing the preferred coded bit sequence of the FSK signal of the disclosed embodiment and its timed relationship to other outputs in the FSK decoder.

FIG. 4 is a graphic representation of the time sequence of events during operation of the disclosed embodiment.

DETAILED DESCRIPTION

Figure 2A:
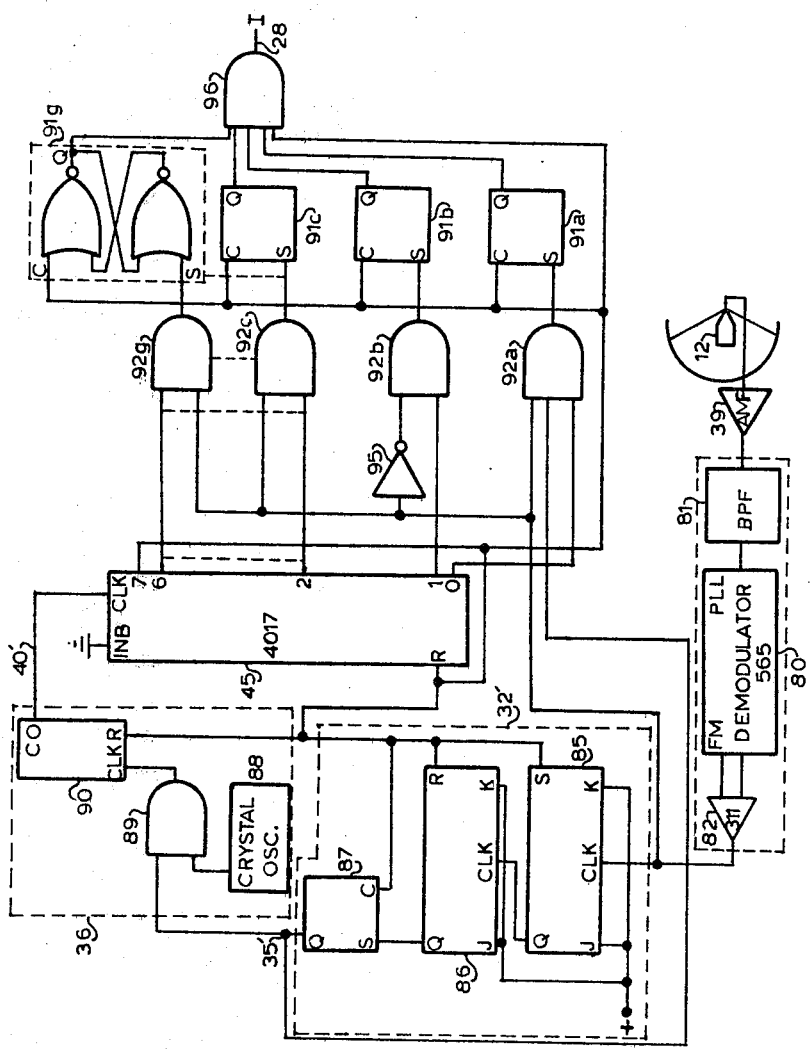
FIG. 2 is a partially schematic partially blocked diagram of station 1 of FIG. 1 of the preferred embodiment.

Turning now to the figures in which like numerals denote like parts, the preferred embodiment of the present invention may be seen. The purpose of the present invention is to measure a distance D, shown as line 10 in FIG. 1 between the phase center of a loudspeaker 11 and the phase center of a microphone 12.

The preferred embodiment of the present invention transmits a predetermined frequency shift keyed (FSK) bit sequence via a radio transmitter from station 1 to station 2. The transit time of the electromagnetic radio waves is so short compared to the times being measured that it is negligible. Upon receipt, detection and confirmation of the proper FSK bit sequence from the radio receiver of station 2 of FIG. 1, a similar FSK bit sequence is provided as an acoustic output to loudspeaker 11. The audible FSK bit sequence traverses distance D and is received at microphone 12. The acoustic FSK sequence is then decoded, and, upon confirmation that the sequence represents the proper transmitted output of station 2, the time evaluator (counter) is stopped.

FIG. 4 shows a graphic representation of a total cycle of operation of the preferred embodiment. It is assumed that the operational sequence is started at a time represented by line 15. The time to generate the first FSK sequence, which is transmitted from station 1, is represented as Tseq between lines 15 and 16 in FIG. 4. Since this bit sequence is transmitted via radio, it is assumed that it is instantaneously received at station 2.

At the end of the first sequence period shown at 16, station 2 will begin to generate an FSK sequence. It takes each bit of this sequence a time Tx to traverse the distance from speaker 11 to microphone 12. At microphone 12 the first bit of the acoustic sequence will be received a time Tx after it is generated at station 2. The end of the sequence generated by station 2 is detected a time Tseq after the first bit is received. This is shown graphically as the time between lines 17 and 8 in FIG. 4.

It will therefore be appreciated that the total time from beginning to end of a cycle of the apparatus operation is Tx (the acoustic transit time) plus two times the length of the FSK sequence. Of course it is possible to use two different FSK seqences of differing lengths at stations 1 and 2.

As shown in FIG. 4, the rather straightforward derivation of the distance between loudspeaker 11 and microphone 12 is shown as the total time from start to stop minus the known time required to generate the FSK sequences times the speed of sound and air, which is shown as a function of temperature.

Referring to FIG. 1, it may be seen that the measuring operation of the present invention is begun by activation of start control 20. An output from start control 20 is provided to point 21 which activates FSK generator 25 and time evaluator 22.

The output of FSK generator 25 is provided along line 26 to radio frequency transmitter 27. Once the start control 20 has been activated, time evaluator 22 begins counting clock pulses in order to ascertain the total time from the time a start signal appears at point 21 until a stop signal is provided on line 28.

Transmission from RF transmitter 27 to RF receiver 29 is considered to be instantaneous for practical purposes. It will be appreciated by those skilled in the art that it is preferred to modulate the output on line 26 in some known manner prior to transmission by a transmitter 27, and that radio frequency receiver 29 will include a demodulator which will provide the FSK bit sequence originally provided by FSK generator 25 onto line 31 to FSK decoder 30.

The output of FSK decoder 30 is provided to a synchronization control circuit 32, the output of which is provided to point 35. Point 35 provides outputs, described in detail hereinbelow, from synchronization control circuit 32 to a crystal oscillator 36 and to a data accumulator 37. Data accumulator 37 provides an output on line 28' which initiates operation of a second FDK generator 25'.

In the preferred embodiment of the present invention SFK generator 25' is identical to FDK generator 25 of station 1. The output of FDK generator 25' is provided to an audio power amplifier 38 which drives loudspeaker 11.

The acoustic FSK output from loudspeaker 11 is received by microphone 12, amplified by amplifier 39 and provided as an input to FSK decoder 30'.

In the preferred embodiment shown in FIG. 1, data accumulator 37', crystal oscillator 36', and synchronization control 32' are all identical to elements 37, 36, and 32 of station 2, respectively.

It will therefore be appreciated that understanding of the operation of station 1 and appreciation of how station 1 may be constructed will enable one skilled in the art to construct station 2, since radio frequency receiver 29, audio power amplifier 38 and loudspeaker 11 are all of conventional construction and may easily be selected by a person of ordinary skill in the electronics arts.

Turning now to FIG. 3, the preferred FSK bit sequence of the preferred embodiment of the present invention is shown. It is to be understood that when the preferred embodiment is operating properly, this bit sequence will be present at point 33' of station 1 as shown in FIG. 1. Each "FSK bit" of the preferred embodiment is considered to have a duration represented by the distance shown by arrows S and S' in FIG. 3. It may therefore be seen from FIG. 3 that the first bit of the preferred FSK sequence is divided into high and low half bits. This high-low half bit sequence at the beginning of the preferred FSK sequence will be referred to as the "sync" bit.

In the preferred embodiment the sync bit is followed by seven other bits having a sequence H, L, H, L, L, H, H. In this sequence "H" represents a high or a logical one bit (a mark of conventional FSK terminology) and "L" represents a low bit or a logical zero (the space of conventional FSK terminology).

It is the use of a predetermined synchronizing signal, the preferred embodiment of which as the high low half bit pair shown in FIG. 3, followed by a predetermined sequence of data bits which allows the preferred embodiment of the present invention to overcome many limitations of the prior art and still be constructed of relatively inexpensive components.

From the foregoing description of FIG. 1, it will be appreciated that once operation of station 1 is understood, the operation of station 2 will also be understood by one skilled in the art. Therefore FIG. 2 shows in detail the components of station 1 and it will be readily apparent from the detailed description of station 1 what apparatus is present in station 2.

Assume for the moment the apparatus of the present invention has been arranged so that it is desired to measure the distance D between the location of loudspeaker 11 at station 2 and microphone 12 at station 1. Referring to FIG. 2, it may be seen that the preferred form of microphone 12 is a microphone including a parabolic reflector.

To begin operation, the operator must activate start control 20 which, in the preferred embodiment, comprises a normally open spring loaded switch 55 and a one shot 56. Closure of switch 55 triggers one shot 56, which will be understood to have timing components associated therewith which cause a narrow pulse to appear at point 21 when one shot 56 is triggered. The output pulse at point 21 is provided to the direct set inputs of flip-flops 57 and 58.

Figure 2B:
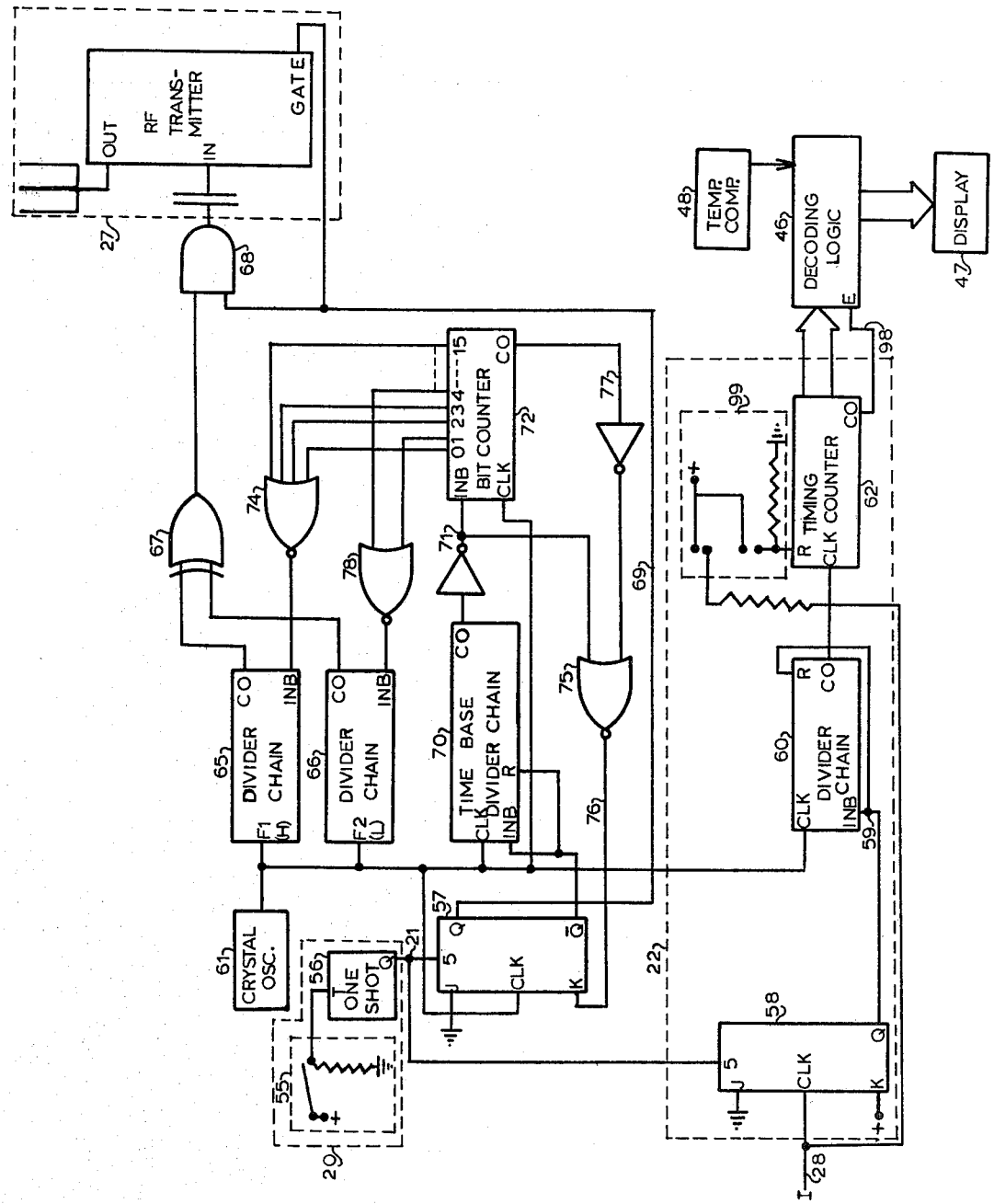

The apparatus enclosed within dashed block 25 in FIG. 2 is the FSK generator 25 of FIG. 1. The apparatus within dashed block 22 of FIG. 2 is the time evaluator 22 of FIG. 1. It will therefore be appreciated that the direct setting of flip-flop 58 corresponds to the start control of time evaluator 22 shown in FIG. 1. The setting of flip-flop 58 provides a logical zero to point 59, which removes the inhibit input from divider chain counter 60 and also removes the reset input from this counter. It will be appreciated by those skilled in the art that divider chain 60 comprises one or more counters interconnected in a conventional manner for scaling the output of a crystal oscillator 61 so that the count of timing counter 62 will be appropriate for the measurement to be undertaken by the system.

The output of crystal oscillator 61 drives time evaluator circuitry 22 and also is the source clock for FSK generator 25. FSK generator 25 generates alternately one of two frequencies, frequency f1 corresponding to the high (H) bits of the code and frequency f2 corresponding to the low (L) bits of the code. The frequency synthesis within FSK generator 25 is conventional and will be described briefly.

A plurality of counters are arranged as a pair of dividing chains 65 and 66. The outputs of these dividing chains are provided to an exclusive OR gate 67, the output of which is provided to AND gate 68. The signal on line 69 is used to gate RF transmitter 27 and to provide a logical one to AND gate 68, allowing alternating signals from the output of exclusive OR gate 67 to pass to transmitter 27.

Exclusive OR gate 67 was chosen so that its output will always change in response to changes in one of its inputs when the other input is held at a constant logical state.

A time base divider chain counter 70 is also driven from oscillator 61. It will be appreciated that time base divider chain 70 determines the duration of bits of the FSK output. Each time time base divider chain 70 counts from zero to its terminal count, an output one clock period wide (the period of crystal oscillator 61) is provided at the carry out (CO) output and is inverted to a logical zero at point 71. The logical zero at point 71 removes the inhibit input from bit counter 72 and allows counter 72 to count to its next state. The logical zero at point 71 is also provided as an input to NOR gate 75, conditioning this NOR gate to provide a logical one on line 76 when a logical zero is present at the other input of NOR gate 75. This will occur when a logical one appears on line 77 from the carry out (CO) output of bit counter 72 as may be seen from FIG. 2.

In the preferred embodiment, bit counter 72 is constructed from a plurality of CMOS counters, for example the type 4017 and 4018 which include on-chip decoded outputs. It will therefore be appreciated that one and only one output of bit counter 72 will be high during any one state of the counter.

The outputs of bit counter 72 are provided to a pair of NOR gates 78 and 79. As may be seen from FIG. 2, sixteen decoded outputs of bit counter 72 are provided. The zero output of bit counter 72 is provided to NOR gate 79, which causes frequency f1 to be provided to RF transmitter 27 when the bit counter 72 is in its zero state. It may also be seen that the next state (1) is provided to NOR gate 78, causing frequency f2 to provide a low bit to transmitter 27. Outputs 2 and 3 of counter 72 are provided to NOR gate 79, causing a high (H) bit to be provided during these two states of counter 72. It will therefore be appreciated that each state of counter 72 corresponds to one half the width of an FSK bit of the preferred sequence as shown in FIG. 3. It will also be appreciated that the zero and one outputs of bit counter 72 provide the high low half bit synchronizing sequence shown in FIG. 3, and that thereafter two contiguous outputs of bit counter 72 are provided to the same one of NOR gate 78 and 79 to produce the full FSK bits shown in FIG. 3.

It is of course possible to use other bit sequences which could be generated simply by changing the interconnections between bit counter 72 and NOR gates 78 and 79.

It will further be appreciated that time base divider chain 70 has a scale which corresponds to a count time equal to one half the duration of a bit as shown in FIG. 3.

When bit counter 72 is in its fifteen state the carry out (CO) output thereof goes high, and upon the next occurrence of a carry out output from time base divider chain 70 at the end of the last high bit of the sequence shown in FIG. 3, NOR gate 75 provides a logical one on line 76 which conditions flip-flop 57 to clear upon the next clock pulse from oscillator 61. It will therefore be appreciated that flip-flop 57 is then cleared, a logical zero is provided on line 69 which inhibits output through AND 68 and therefore FSK generator 25 remains in a quiescent state until flip-flop 57 is again reset by start control 20.

It will be appreciated by those skilled in the art that the FSK generator 25' of station 2 as shown in FIG. 1 will be identical to generator 25 shown in FIG. 2 and that the output on line 28' will be used to set flip-flop 57 in order to begin the sequence of FSK generation. It will also be appreciated that the output of AND gate 68 will be provided to audio amplifier 38 of station 2 rather than to RF transmitter as shown in FIG. 2.

While the above described sequence of FSK generation has been occurring, time evaluator circuitry 22 has been counting a time equal to Tseq between lines 15 and 16 shown in FIG. 4.

Since the first FSK sequence is transmitted through RF transmitter 27 and received by RF receiver 29 at station 2 (FIG. 1) the transmission time may be considered instantaneous and FSK decoder 30 will have been decoding the sequence.

FSK decoder 30 will decode the sequence and load bits into data accumulator 37 under the control of sync control 32 and oscillator 36 shown in FIG. 1. Upon successful accumulation in data accumulator 37 corresponding to receipt of all the FSK bits in the sequence shown in FIG. 3, an output is provided on line 28' activating FSK generator 25' to provide the audible FSK sequence (identical to the sequence described hereinabove) to loudspeaker 11.

It will be appreciated that FSK decoder 30 and data accumulator 37 perform in the same manner as FSK decoder 30' and data accumulator 37' at station 1 which are shown in detail in FIG. 2. Therefore the operation of this apparatus at station 1 upon receipt of the audible FSK sequence will now be described and will also serve to describe the operation of the corresponding elements at station 2.

It takes a time Tx (FIG. 4) for the audible FSK to travel distance D from loudspeaker 11 to microphone 12. Turning to FIG. 2, it will be appreciated that the audible FSK signals are received by parabolic microphone 12 then provided to amplifier 39. The output of amplifier 39 is provided to FSK decoder 30' which, as may be seen from FIG. 2, includes a band pass filter 81 and an FM phase locked loop demodulator 80. The output of demodulator 80 is provided to a comparator 82 which, in the preferred embodiment, is of the type LM311 as manufactured by National Semiconductor.

It will be appreciated by those skilled in the art that the preferred embodiment of demodulator 80 is constructed around a type 565 phase lock loop integrated circuit, and that the outputs of demodulator 80 which are provided to comparator 82 include a reference output and the output of the phase comparator of the loop contained within the type 565 circuit. Therefore the output of comparator 82 which appears at point 33 will alternate between logical one (H) and logical zero (L), depending upon the relationship of the frequency at the output of band pass filter 81 to the free running frequency of the voltage controlled oscillator of the 565 circuit.

Note that with the selection of a frequency shift keyed signal for the audio signal used to measure distance D, together with the selection of a phase lock loop as a decoding element, the use of a band pass filter 81 of a lower Q than the notch filters conventionally used in single tone acoustic distance measuring apparatus is possible. Therefore FSK decoder 30' will be less sensitive to rise time variations in the outputs of the filter 81 than those which are conventionally encountered in high Q notch filters.

As will be appreciated by those skilled in the art, the output of demodulator 80 will respond very rapidly to changes in input frequency once the 565 phase lock loop has achieved a locked condition. It will also be appreciated that times on the order of milliseconds may be required for the loop to initially achieve lock, in that the locking time (the time from application of signal until the loop achieves lock) may vary over a considerable range in commercially available phase lock loop integrated circuits. It is therefore the function of synchronization control 32' and the pair of sync half bits shown in FIG. 3 to eliminate variations in the time measured due to variations in loop lock time.

Dashed line 24, shown as the output at point 33' during the high synchronizing half bit (FIG. 3), is used to indicate the uncertainty of time of occurrence of the first rising edge due to possible variations in lock time in the modulator 80. It will therefore be appreciated that the first rising edge of the output at 33' will not necessarily represent the time of occurrence of the first high half bit received at microphone 12 with acceptable accuracy.

Sychronizing control circuit 32' is used to effectively strip the first synchronizing half bits and to synchronize data accumulator 37' to the incoming FSK signal. This allows the modulator 80 to have sufficient time to achieve lock, and therefore the subsequent transitions from high to low detected by modulator 80 will accurately (within accepted tolerances) represent the time of occurrence of high to low and low to high transitions in the FSK signal.

As will be appreciated from the description of the termination of the data accumulator cycle hereinbelow, a pair of flip-flops 85 and 86 will be initially be set to one and zero, respectively. Upon the first occurrence of a rising edge on the first synchronizing half bit, flip-flop 85 will be cleared. The next occurrence of a rising edge at the end of the low half bit will cause flip-flop 85 to set, which will also cause flip-flop 86 to be set since the clock input of flip-flop 86 is connected to the asserted output of flip-flop 85. This second rising edge will occur after demodulator 80 has achieved a locked condition, and therefore the second rising edge accurately represents the beginning of the first high full bit. The setting of flip-flop 86 sets latch 87 which provides a logical one at point 35'.

The one at point 35' enables the output of oscillator 88 to pass through AND gate 89 to a counter 90 serving as a divider. Periodically the counter 90 will reach its terminal count and provide a pulse at point 40', causing a clock pulse to be provided to data accumulator 37'.

As may be seen from FIG. 3, the clock pulses at point 40' are provided to counter 45 which comprises part of the data accumulator. It will also be appreciated that the decoded FSK output at point 33' is provided as an input to data accumulator 37'.

The decoded FSK output is provided in either asserted or negated form to each of a plurality of AND gates 92a–92g. The output of each of AND gates 92a–92g is provided to the set input of one of a plurality of latches 91a–91g. As may be seen from FIG. 2, the preferred embodiment includes seven of AND gates 92 and seven of latches 91, one each for each full bit of the bit sequence shown in FIG. 3. It will also be understood that the use of NOR gate type latches, as shown in detail for latch 91g, is preferred and in no way limits the scope of the present invention.

Upon each receipt of a clock pulse from point 40', counter 45 will enable one of AND gates 92a–92g. The preferred embodiment of counter 45' is a Cmos type 4017 having decoded outputs and therefore one and only one of the outputs of counter 45 will be high at any one time. It will therefore be appreciated that AND gates 92 will be sequentially enabled by counter 45 to set one of latches 91 if the proper input is present at point 33'.

The timing relationship between the decoded FSK output at point 33', the clock pulses at 40', and the output of synchronization controller 35' may be seen in FIG. 3. Also, the output state of counter 45 is shown in the bottom line of FIG. 3. Therefore, after the occurrence of the pair of synchronization half bits, the output of synchronization control circuit at point 35' goes high. Counter 45 will still be in its zero state and the first high bit will be present at point 33'. The input to AND gate 92a also includes point 35' and therefore, when the first high bit is detected, the output of AND gate 92a goes to a logical one setting flip-flop 91a. The remaining AND gates 92b–92g have only two inputs, one of the outputs of counter 45 and either the asserted or negated form of the decoded FSK output at point 33'.

When the loop is in lock, it will be understood that the accuracy of the timing circuitry of data accumulator 37 is controlled by the accuracy of crystal oscillator 88. Therefore the synchronization provided by synchronization control 32' allows the clock pulses at point 40' to be synchronized to the width of the FSK bits within tolerances controlled by the tolerances of crystal oscillator 88 and by the crystal oscillator 61 of the FSK generator 25'.

The second decoded FSK bit (L) will be provided at point 33' when counter 45 is in its one state (FIG. 3). The low bit at point 33' will be inverted by inverter 95, and therefore during the occurrence of the second FSK bit AND gate 92b will provide a logical one output setting latch 91b. Similarly, on the next FSK decoded bit (H) AND gate 92c will set latch 91c.

From the foregoing it will be appreciated that inverters will be provided to invert the output at point 33' for AND gates 92d and 92e (not shown) and that upon receipt of the preferred FSK sequence all of latches 91a–91g will be set. Since latch 91g was set some time during the early portion of the occurrence of the last high FSK bit, the end of this bit will be signalled by counter 45 counting to its seven count. When this occurs, all inputs to AND gate 96 become one and an output is provided along line 28 indicating successful accumulation by data accumulator 37' the entire FSK bit sequence.

The provision of a logical one on line 28 strobes the clock input to flip-flop 58 and thus this flip-flop will be cleared, reestablishing a logical one at point 59. The logical one at point 59 inhibits the counter of divider chain 60 and also resets same to zero.

Therefore the occurrence of a zero to one transition on line 28 stops counting of timing counter 62 and serves as the stop function of time evaluator 22 as shown in FIG. 1.

The entry of counter 45 into the seven state also resets this counter and resets dividing counter 90 and latch 87. This same signal also sets flip-flops 85 and 86 to their one and zero states, respectively.

It will thus be appreciated that the count in timing counter 62 at the end of the entire operating sequence will represent the total time between lines 15 and 18 as shown in FIG. 4.

It will be appreciated that decoding logic 46 is of a conventional nature which will effectively subtract an appropriate number of counts from timing counter 62 to correspond to the time it took FSK generating circuitry to generate the two sequences described hereinabove. Therefore the output of decoding logic 46 will provide signals to display 47 providing a numerical indication of distance D (FIG. 1).

It is to be understood that temperature compensation 48 as shown in FIG. 1 may be provided in a plurality of conventional ways. As shown in FIG. 1, temperature compensation 48 includes a conventional temperature transducer which provides signals to decoder logical 46 in order to compensate for the ambient temperature during the measurement.

It is also possible to assure that oscillators 61 and 88 may have output frequencies which vary linearly with temperature so as to have an inherent temperature compensation represented in the final count of timing counter 62.

It will be appreciated from the foregoing description that upon a successful measurement the apparatus is automatically reset for the next measurement. If the scaling of divider chain 60 is chosen inappropriately by the operator or if an error has occurred which will prevent data accumulator 37' from properly accumulating the FSK sequence, it will be apparent that timing counter 62 will be allowed to overflow. If this condition occurs the carry out (CO) output of timing counter 62 is provided along line 98 to indicate to decoding logic 46 that an error has occurred.

It will be appreciated from inspection of FIG. 2 that momentary switch 99 may be used to reset time evaluator circuitry 22 upon the occurrence of an error condition. This switch is preferably embodied by a pushbutton double pole momentary type switch.

From the foregoing description it will be appreciated that the present invention provides a new and improved device for acoustic distance measuring. The selection of the frequency shift keyed sequence rather than the beginning of a single tone as the acoustic signal transmitted provides many advantages. Among the advantages are the ability to detect a signal by use of a phase lock loop decoder, which allows the apparatus to successfully operate in ambient noise levels which could not be tolerated by prior art acoustic measuring devices. Furthermore the inherent error due to rise times and group delays of conventional circuitry are eliminated by use of the synchronization control circuitry, and therefore the response time of the phase detector output of a phase lock loop in a locked state provides a more accurately timed output.

It will be appreciated that the foregoing description of the preferred embodiment is by way of example and that other embodiments of the present invention may be constructed within the scope of the claims below.

I claim:

1. Distance measuring apparatus comprising:
    timing means for detecting the length of time between an occurrence of a first signal and an occurrence of a second signal;
    a start control means selectively operable to provide said first signal;
    a radio transmitter for providing a radio frequency signal in response to said first signal;
    a radio receiver for receiving said radio frequency signal;
    a sound generating means for generating a predetermined first subsequence and a second subsequence of sound signals having a predetermined duration in response to said radio receiver receiving said radio frequency signal; and
    sound receiving means for receiving and detecting said sound signals comprising a clock and a synchronizing means responsive to said first subsequence to synchronize said clock to said second subsequence and providing said second signal upon detection of termination of said second subsequence.

2. A method of measuring the distance between a first location and a second location comprising the steps of:
transmitting a radio signal from first said location to said second location and simultaneously activating a time measuring device;
receiving said radio signal at said second location;
generating a predetermined first sequence and second sequence of sound signals at said second location having a predetermined duration in response to said radio signal;
receiving said first sequence of sound signals at said first location and processing said first sequence to synchronize said time measuring device to said second sequence;
receiving said second sequence of sound signals at said first location; and
deactivating said time measuring device upon detection of the end of said predetermined second sequence of sound signals.

3. In a distance measuring apparatus including a timing means for detecting the elapsed time between the occurrence of a start signal and the occurrence of a stop signal including means for transmitting a sequence of acoustic signals from a first location to a second location and means for detecting said sequence of acoustic signals at said second location; the improvement wherein:
said sequence of acoustic signals comprises a first frequency shift keyed subsequence and a second frequency shift keyed subsequence characterized by a predetermined time duration between the beginning of said first subsequence and the termination of said second subsequence;
said timing means includes a clock; and
said means for detecting includes synchronizing means responsive to said first subsequence to synchronize said clock to said second subsequence and means for generating said stop signal in response to said termination of said second subsequence.

* * * * *